US008199668B2

(12) United States Patent
Wallis et al.

(10) Patent No.: US 8,199,668 B2
(45) Date of Patent: Jun. 12, 2012

(54) METHOD FOR ATTACHING TO A PARTITIONED QUEUE SPREAD ACROSS A PLURALITY OF MESSAGING SERVERS

(75) Inventors: Graham Derek Wallis, Hampshire (GB); David Ware, Wiltshire (GB)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 11/744,929

(22) Filed: May 7, 2007

(65) Prior Publication Data

US 2008/0040396 A1 Feb. 14, 2008

(30) Foreign Application Priority Data

May 24, 2006 (GB) .................................. 0610303.0

(51) Int. Cl.
*H04L 12/28* (2006.01)
(52) U.S. Cl. ......... 370/254; 709/201; 709/203; 709/205
(58) Field of Classification Search .................. 370/229, 370/230.1, 254, 412; 709/204, 19, 225, 313; 709/219, 314; 455/204, 19, 219, 225, 313, 455/314

See application file for complete search history.

(56) References Cited

U.S. PATENT DOCUMENTS

| | | | |
|---|---|---|---|
| 2002/0052968 A1* | 5/2002 | Bonefas et al. | 709/231 |
| 2002/0099671 A1* | 7/2002 | Mastin Crosbie et al. | 705/500 |
| 2003/0018787 A1* | 1/2003 | Neal et al. | 709/227 |
| 2003/0105800 A1* | 6/2003 | Cullen | 709/201 |
| 2004/0215848 A1* | 10/2004 | Craddock et al. | 710/39 |
| 2005/0058085 A1* | 3/2005 | Shapiro et al. | 370/256 |
| 2005/0131908 A1* | 6/2005 | Buxton et al. | 707/10 |
| 2005/0172029 A1* | 8/2005 | Burke et al. | 709/232 |
| 2005/0240654 A1* | 10/2005 | Wolber et al. | 709/206 |
| 2006/0080670 A1* | 4/2006 | Lomet | 719/314 |
| 2006/0136932 A1* | 6/2006 | Bose et al. | 719/314 |

OTHER PUBLICATIONS

Oracle Advanced Queuing "Features of Advanced Queuing": www.cs.umbc.edu/help/oracle8/server.815/a67781/c16queue.htm.
http://publib.boulder.ibm.com/infocenter/wasinfo/v6r1/index.jsp?topic=/com.ibm.websphere.pmc.nd.doc\concepts\cjb0001_.html.
http://publib.boulder.ibm.com/infocenter/wasinfo/v6r1/index.jsp?topic=/com.ibm.websphere.pmc.nd.doc\tasks\tjn0034_.html.
http://www.elink.ibmlink.ibm.com/public/applications/publications/cgibin/pbi.cgi?CTY=US&FNC=SRX&PBL=SC34658900.

* cited by examiner

*Primary Examiner* — Hassan Phillips
*Assistant Examiner* — Anez Ebrahim
(74) *Attorney, Agent, or Firm* — Patents on Demand P.A.; Brian K. Buchheit; Scott M. Garrett

(57) ABSTRACT

There is disclosed a method, apparatus and computer program for an application instance to request attachment to a queue partition on a messaging server within a plurality of messaging servers, each messaging server holding at least one queue partition, the set of queue partitions together forming a single queue. An application instance requests attachment to a queue partition, the request requesting exclusivity with regard to other application instances having a common identifier. Responsive to an indicating that the request has been successful, the application instance interacts with the queue partition.

18 Claims, 7 Drawing Sheets

METHOD FOR ATTACHING TO A PARTITIONED QUEUE SPREAD ACROSS A PLURALITY OF MESSAGING SERVERS

FIELD OF THE INVENTION

The invention relates to distribution of applications across messaging servers.

BACKGROUND OF THE INVENTION

In a clustered messaging architecture it is common to have a virtual 'single' queue of messages distributed across a cluster of multiple messaging servers. In such an architecture, each server owns a subset of messages for that single queue. Each subset of messages typically exists on a partition of the single queue. It is also possible that only a subset of the clustered servers are running at any one time.

It is important to achieve an optimal transmission and/or consumption of messages from a partitioned queue. The invention will however be described in terms of consumption of messages for ease of explanation only.

If there are multiple applications (or multiple instances of a single application; the description is intended to encompass both variations), all consuming the same type of messages, with each application being capable of consuming all messages on a single partitioned queue, then there should be an even distribution of applications (application instances) across all messaging servers that own a partition of the queue, i.e. at least one application being connected to each of these servers.

There may on the other hand exist multiple applications consuming different types of messages with each application comprising multiple instances. In this case, there should be an even distribution of an application's instances across all the messaging servers that own a partition of the queue, i.e. at least one instance of the application being connected to each of these servers. In this way it is ensured that messages of the type applicable to the application will get consumed from each queue partition. Note, applications can be consuming according to some property of a message or they could be selecting a particular type of message based on the value of some header or pay load content—i.e. via a filter.

Optimal distribution of application instances typically becomes a problem if there are not many application instances. If you have a large number of application instances (orders of magnitudes more than the number of partitions) then their distribution is likely to he reasonably even across the partitions no matter what distribution mechanism is used, for example a simple random choice of partition by the application or a round-robin distribution by a number of distribution points. The fewer instances of the application that are attaching, the less likely it is that using a simple distribution mechanism will result in an even distribution. Particularly where there are only a few application instances (about the same number as there are partitions) then it becomes critical to ensure that their distribution is even (ideally at feast one application instance attached to each partition).

Each application will consume a particular type of message from a single partition and an even distribution therefore means that messages will not be left marooned on a queue partition due to the absence of an application consuming messages of that type.

Correctly coordinating the distribution of clients across multiple servers is not so difficult if all the applications initially go to a single point that can coordinate these applications. Unfortunately the reasons for having multiple servers is to prevent a single point of failure and to balance the work load across them, so having all the applications communicate with a single point is an obvious bottle neck. So when there is not a single point coordinating all the applications, the ability fur any one server to know where all the applications are connected is lost.

A simplistic example is now given in which there are four partitions and four instances of an application attaching;

For a single distribution point using round-robin distribution:
partition 1: app instance 1
partition 2: app instance 2
partition 3: app instance 3
partition 4: app instance 4

When you have two round-robin distribution points and applications 1 and 2 go to the first distribution point and 3 and 4 go to the second for distribution, the outcome might be as follows:
partition 1: app instance 1 and 3
partition 2: app instance 2 and 4
partition 3: none
partition 4: none If there is a single distribution point allocating connections to partitions there is still the problem that the distribution point must know the intentions of each application, distinguish it from other applications and recognise other instances of the same application. Generally there are many different applications attaching to such servers, therefore being aware of them all becomes a difficult and potentially costly (performance and resource) operation.

So using a similar example where there is no knowledge of individual applications, this time with a second application, again with four instances attaching to the same partitions, where the attach order is application 1, application 2, application 1, application 2 etc.:
partition 1: app 1 instance 1, app 1 instance 3
partition 2: app 2 instance 1, app 2 instance 3
partition 3: app 1 instance 2, app 1 instance 4
partition 4: app 2 instance 2, app 2 instance 4

Here it can be seen that application 3 is only attached to partitions 1 and 3 and application 2 to partitions 2 and 4. So any messages for application 1 going to partitions 2 or 4 will not be processed.

There are a number of existing ways to solve to varying degrees the problem of evenly distributing application instances:

It is known to manually configure each instance of an application to connect to each server. This is very restrictive in that each instance of the application now has a reliance on its configured server being available for it to consume any messages; if also ties the application's configuration tightly to the architecture of the messaging servers. If the architecture changes, the application's configuration also has to change.

Some messaging systems provide a solution whereby any application attempting to connect to a cluster of messaging servers will be directed to one of the servers based on a round-robin distribution by one or more 'bootstrap' servers. The downside of this is that the distribution applies to all applications attempting to attach to a server in the duster, with no recognition of multiple instances of the same application. This can result in a fair distribution of ail applications connected to the servers; but, in a worse case scenario, it is possible for all instances of the same application to be connected to the same server, resulting in only a single partition of the queue being consumed from by that application. Since an application may be singularly responsible for a particular type of message, this could prove problematic. Further application instances can detach themselves and the bootstrap servers would not have this knowledge to apply when allocating a new application instance to a queue partition.

It is also known to statically configure a queue partition to only allow a single consuming application to be attached at any one time. If a partitioned queue is configured in such a way, the consuming application can connect to each server in the cluster in turn and attempt to attach to the queue partition local to that server. If they succeed in attaching then they know they are the only consuming application on that partition; if they fail then they attempt to connect to the next server and try again until they find an available partition. This ensures that each partition has at most one instance of the application at any one time. The downside is when there are more instances of the application than available partitions of the queue, some instances of the application will be left without a queue partition from which to consume. It also relies on the fact that there are no other applications consuming from the same queue partitions (i.e. applications that are not instances of the same distributed application). Another downside is that the queue must be statically configured to only allow one consumer per partition.

It is also known to allow an application to specify, at runtime, if they require 'exclusive access' to a queue partition or not. This is disadvantageous when there are more instances of the application than available partitions of the queue, in this case some instances of the application will be left without a queue partition to consume from. Further, it also relies on the fact that there are no other applications consuming from the same queue partitions (i.e. applications that are not instances of the same distributed application).

SUMMARY OF THE INVENTION

According to a first aspect, there is provided a method for an application instance to request attachment to a queue partition on a messaging server within a plurality of messaging servers, each messaging server holding at least one queue partition, the set of queue partitions together forming a single queue, the method comprising: an application instance requesting attachment to a queue partition, the request requesting exclusivity with regard to other application instances having a common identifier; and responsive to an indication that the request has been successful, interacting with the queue partition.

In one embodiment, there are a plurality of applications comprising at least two instances each. In this case the common identifier is an application id and the request requests that the requesting application instance is the only instance of the application attached to the queue partition.

In one embodiment, the common identifier is a message type and the request requests that the requesting application instance is the only application instance consuming a particular message type when compared with other application instances already attached to the queue. Message type could be based on a selector (filter) provided by the application instance at attach time or could be based on a message property provided at attach time.

In one embodiment, exclusivity is only requested while the attach request is being processed by a receiving messaging server. If the request is unsuccessful, then the same request is preferably made of each queue partition within the set, until either attachment is successful, or all queue partitions have received yet been unable to fulfil the request. If all queue partitions are unable to fulfil the request, attachment to a queue partition is preferably requested without regard for other application instances. The queue partition is then attached to the application instance.

In one embodiment, with each receipt of an indication that an attachment request has been unsuccessful, the number of application instances that prevented the attachment request from being successful are received. Such information is used to determine which of the queue partitions in the set potentially has the least number of preventing application instances attached thereto. Attachment to the queue partition with potentially the least number of preventing application instances attached thereto is then preferably requested.

According to another aspect, there is provided a method for a messaging server to process an attachment request from an application instance requesting attachment to a queue partition on the messaging server, the messaging server being one within a plurality of messaging servers, each messaging server holding at least one queue partition, the set of queue partitions together forming a single queue, the method comprising: receiving an attachment request from an application instance requesting attachment to a queue partition, the request requesting exclusivity with regard to other application instances having a common identifier; determining whether the request can be fulfilled; and responsive to a negative determination, rejecting the attachment request.

The invention may be implemented in computer software and distributed via storage media.

BRIEF DESCRIPTION OF THE DRAWINGS

First and second embodiments of the present invention will now be described, by way of example only, and with reference to the following drawings.

DETAILED DESCRIPTION

FIG. 3 illustrates the environment in which the present invention, in accordance with a first embodiment, operates. In this first embodiment there are multiple applications (or indeed multiple instances of a single application) that all consume the same type of messages and that are responsible for all messages on queue partitions 40, 50, 60.

Producer applications 70, 80, 90 transmit messages to messaging servers 10, 20, 30 where they are placed on one of queue partitions 40, 50, 60 for retrieval by consuming applications 95. As discussed previously, it is important to ensure that the consuming applications are evenly distributed across queue partitions. Otherwise it is possible that messages may be left marooned on a queue partition without any application for consuming them. Equally however, if there are more consuming applications than partitions, it is important not to waste any of the consuming applications.

Figure 1:
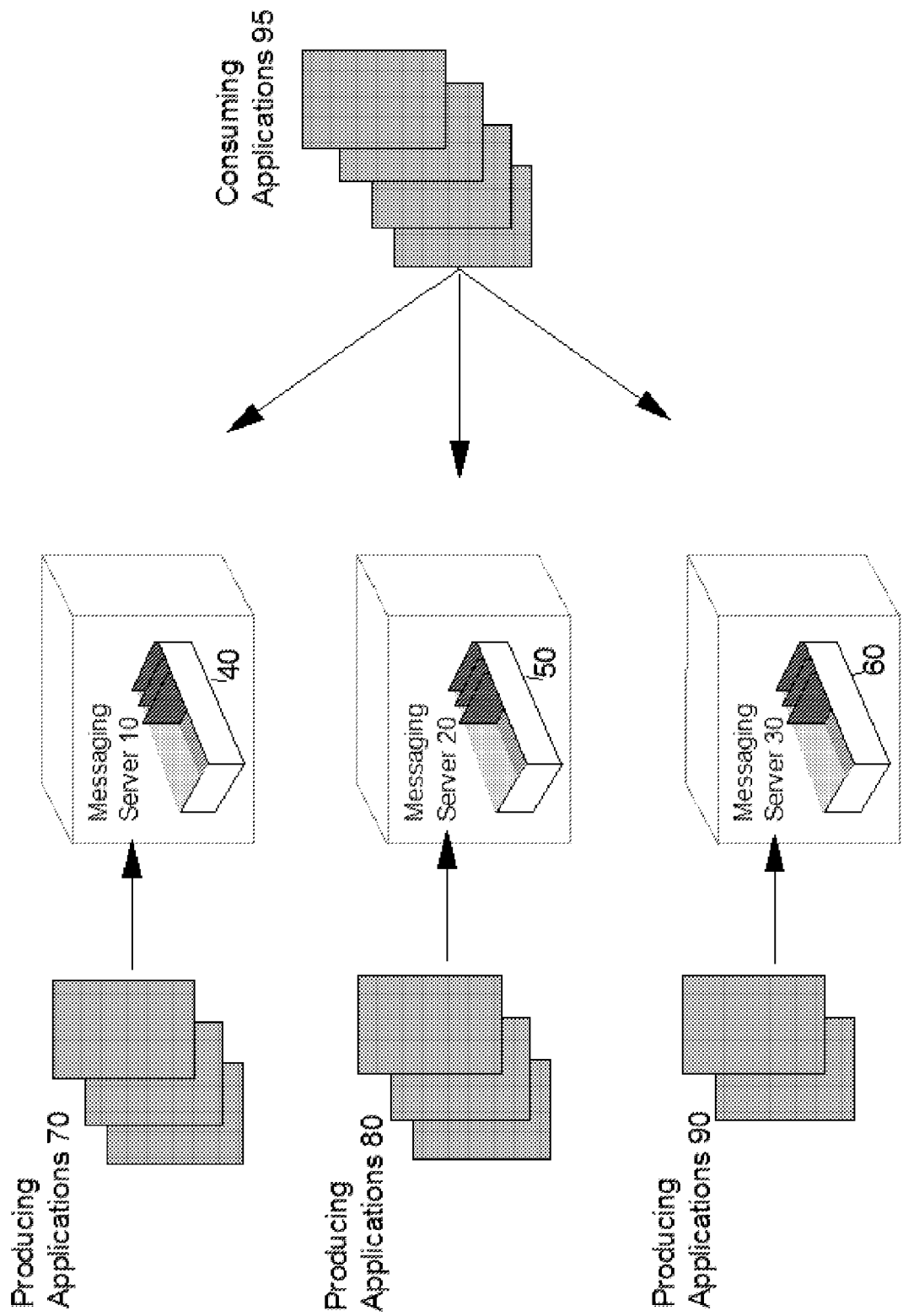
FIG. 1 illustrates the environment in which a first embodiment of the invention operates.
Figure 2A:
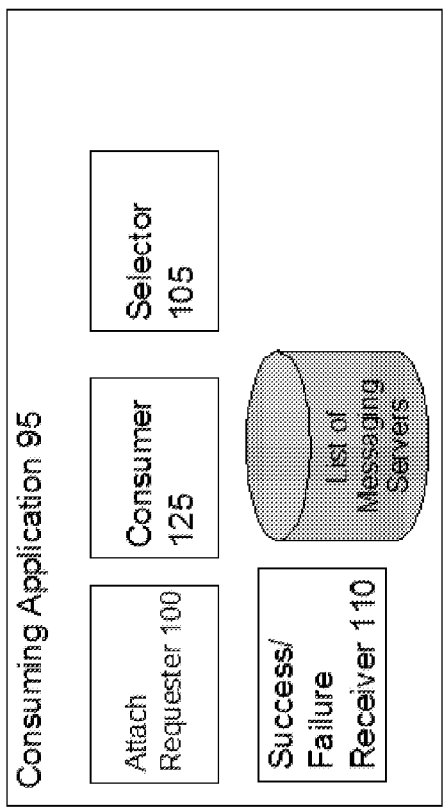
FIGS. 2a and 2b show the components of a consuming application and a messaging server, in accordance with the first embodiment.
Figure 2B:
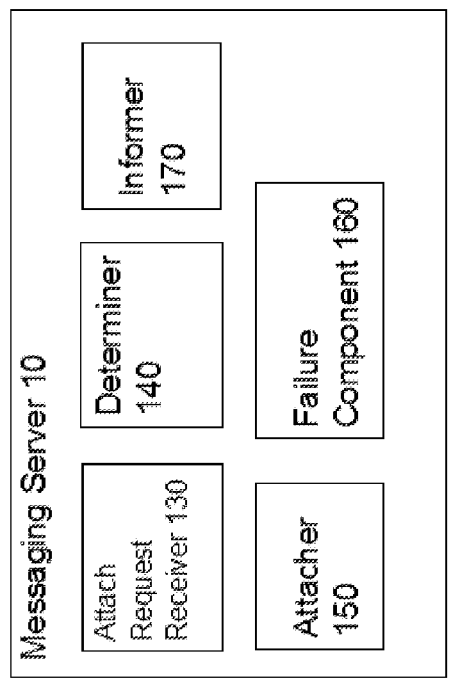
Figure 3A:
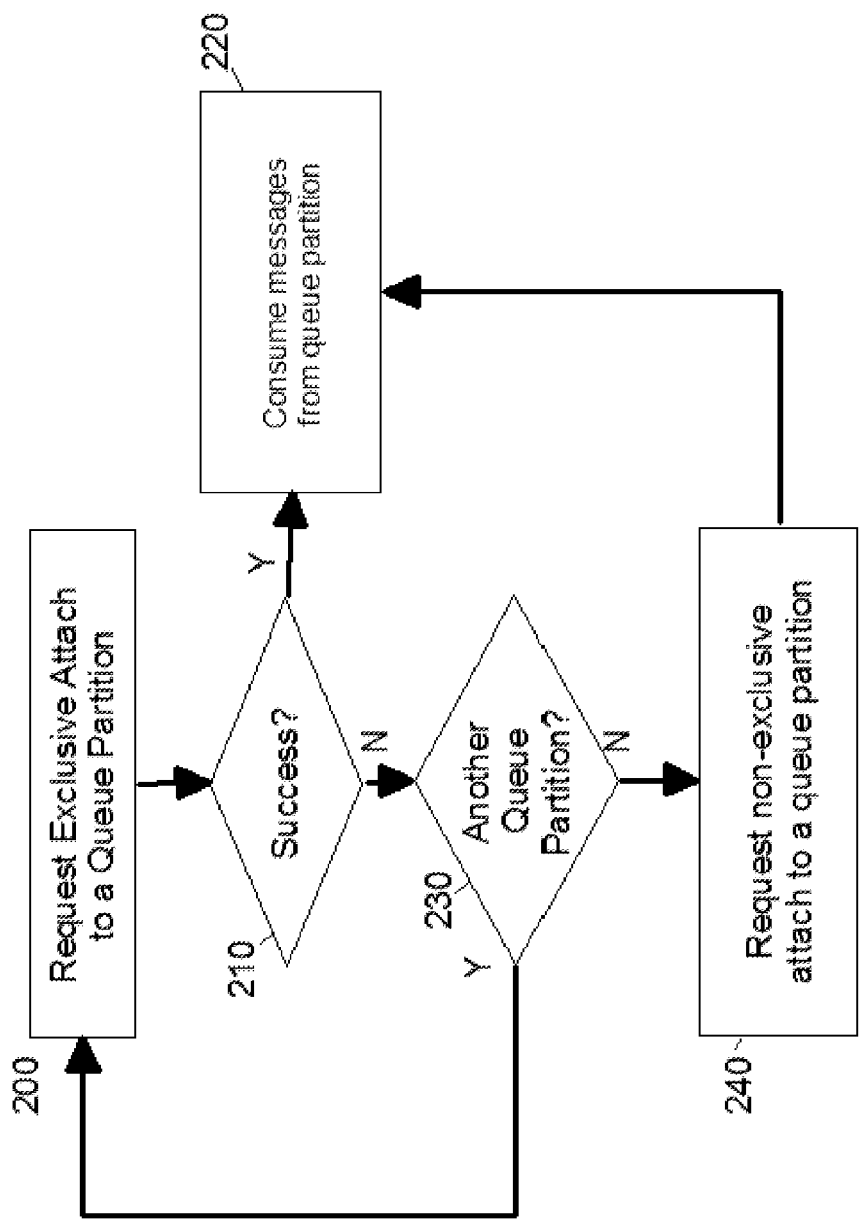
FIGS. 3a and 3b show the processing performed by a consuming application and a messaging server, in accordance with the first embodiment.
Figure 3B:
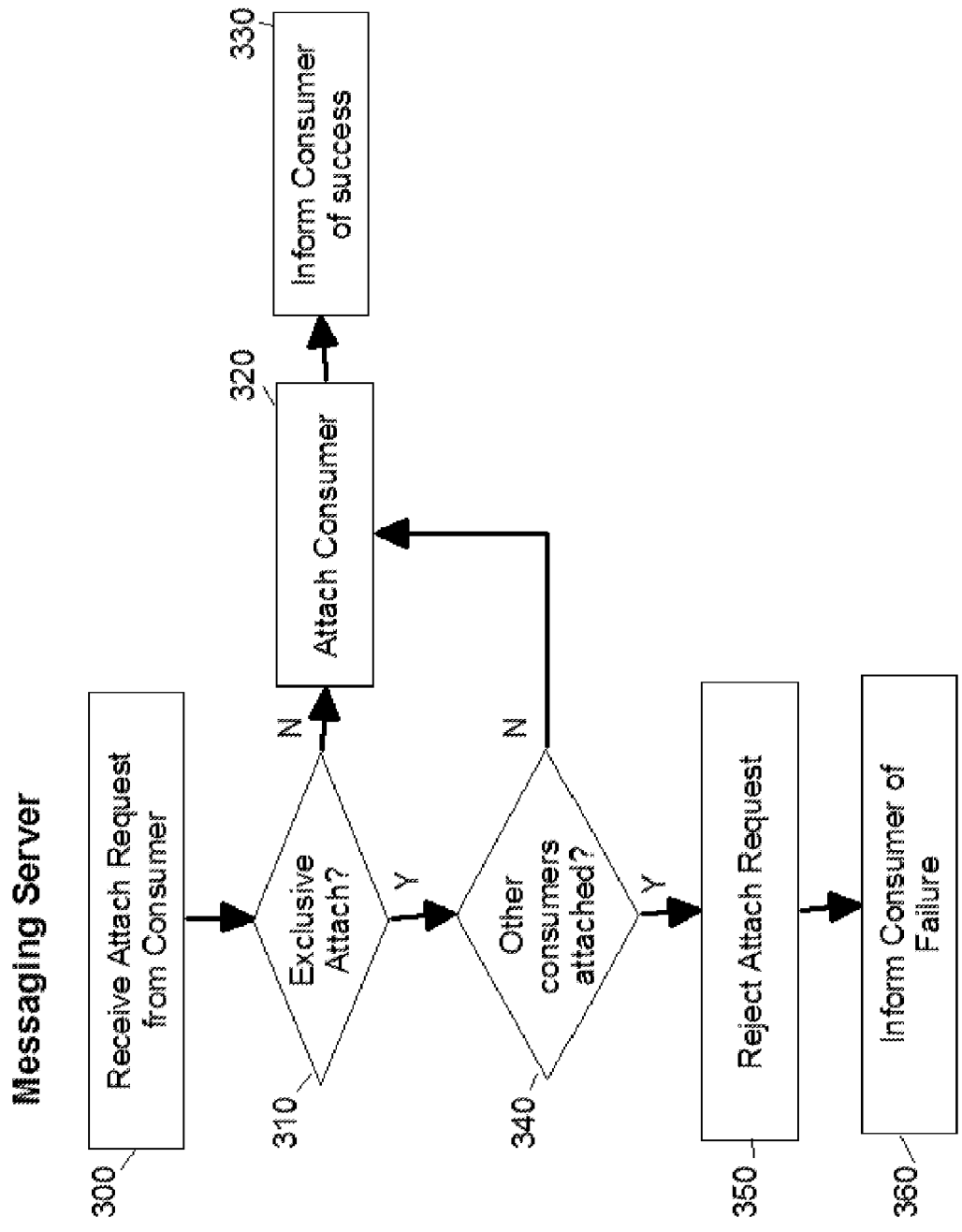

FIGS. 2a and 2b illustrate the components of a first embodiment of the present invention. FIGS. 3a and 3b show the processing performed by such components in accordance with the first embodiment. These figures should be read in conjunction with one another.

Consuming application 95 requests (via attach requester 100) an exclusive attach to queue partition 40 (step 200). This means that application 95 wants (at the time of attach) to be the only application attached to the queue partition. Messaging server 40 receives the attach request at step 300 via attach request receiver 130. At step 310, determiner component 140 determines whether exclusive access is being requested. If the answer is no, then attacher 150 permits the attach to go ahead (step 320) and informer component 170 informs the consuming application that the attach has been successful (step 330).

The consuming application 95 receives notification of the success of the attach via success/failure component 110 (step 210) and begins to consume messages from the queue partition to which it has attached via consumer component 125.

If, on the other hand, an exclusive attach is requested, then the determiner component 140 at messaging server 10 determines whether other consumers are already attached (step 340). If the answer is no, then attacher 150 permits the attach to go ahead and informer component 170 informs the consuming application that the attach has been successful.

Again, consuming application 95 receives notification of the success of the attach via success/failure component 110 (step 210) and begins to consume messages from the queue partition local to which it has attached via consumer component 125.

If it is determined at step 340 by messaging server 10's determiner component 140 that there are other consumers already attached, the attach request is rejected by failure component 160 (step 350). Informer component 170 then informs the consuming application that their attach has not been successful (step 360).

The consuming application 95 uses success/failure receiver 110 to determine at step 210 that the attach has failed.

The consuming application then attempts to select another queue partition for which an exclusive attach can be requested instead (step 230, selector 105). Each consuming application has access to (either locally or shared access) a list of available queue partitions. This may be requested at startup. Selector 105 works its way through this list.

If another queue partition can be selected (step 230), then the process loops round. If, on the other hand, all queue partitions already have consuming applications attached, then the consuming application may choose to attach to a queue partition (step 240, attach requester 100) that is already associated with one or more consuming applications audio start consuming therefrom (step 220, consumer 125). In other words, the consuming application does not specify the "exclusive" attach option second time around (normal attach only). It does not matter if other applications, already attached to the queue partition, are attached with the exclusive option set. This is because the exclusivity was only enabled while the attach request was processed.

With respect to deciding which queue partition to target second time around, this may be the queue partition with the least number of consuming applications currently attached. Each time an attach failure is received by component 110 at step 210, this component also receives an indication from the relevant messaging server (via an informer component 170) as to the number of consuming applications currently attached to the queue partition. The consuming application uses this information to keep track of the queue partition with the least number of consuming applications attached and then preferably requests a non-exclusive attachment to that queue partition. Of course, such information is not guaranteed to be entirely accurate since consuming applications can attach and detach. However, it gives the requesting consuming application an idea, as to which queue partition might be the most sensible one to attach to. A consuming application may choose to periodically poll other messaging servers to find out how many consuming applications are attached to their queue partitions to be able to make a determination as to whether it is appropriate to relinquish a current attachment in favour of another one.

It is important to note that, unlike the prior art, the exclusive attach option is relevant at attach time only. This means that consuming applications 95 are not prevented from requesting access to a queue partition when, another consuming application 95 had previously requested an exclusive attach to that queue partition and is still attached thereto.

Thus when there are more consuming applications 95 than queue partitions, consuming applications may double up (treble up etc.) on a queue partition. In this way, consuming application resources are not wasted. A prior art exclusive attach meant that only one consuming application 95 at a time could attach to a queue partition. This was because the exclusivity lasted for the duration of the attach rather than be relevant at attach time only. Preferably the number of consuming applications 95 already attached to the various queue partitions is taken into account.

Figure 4A:
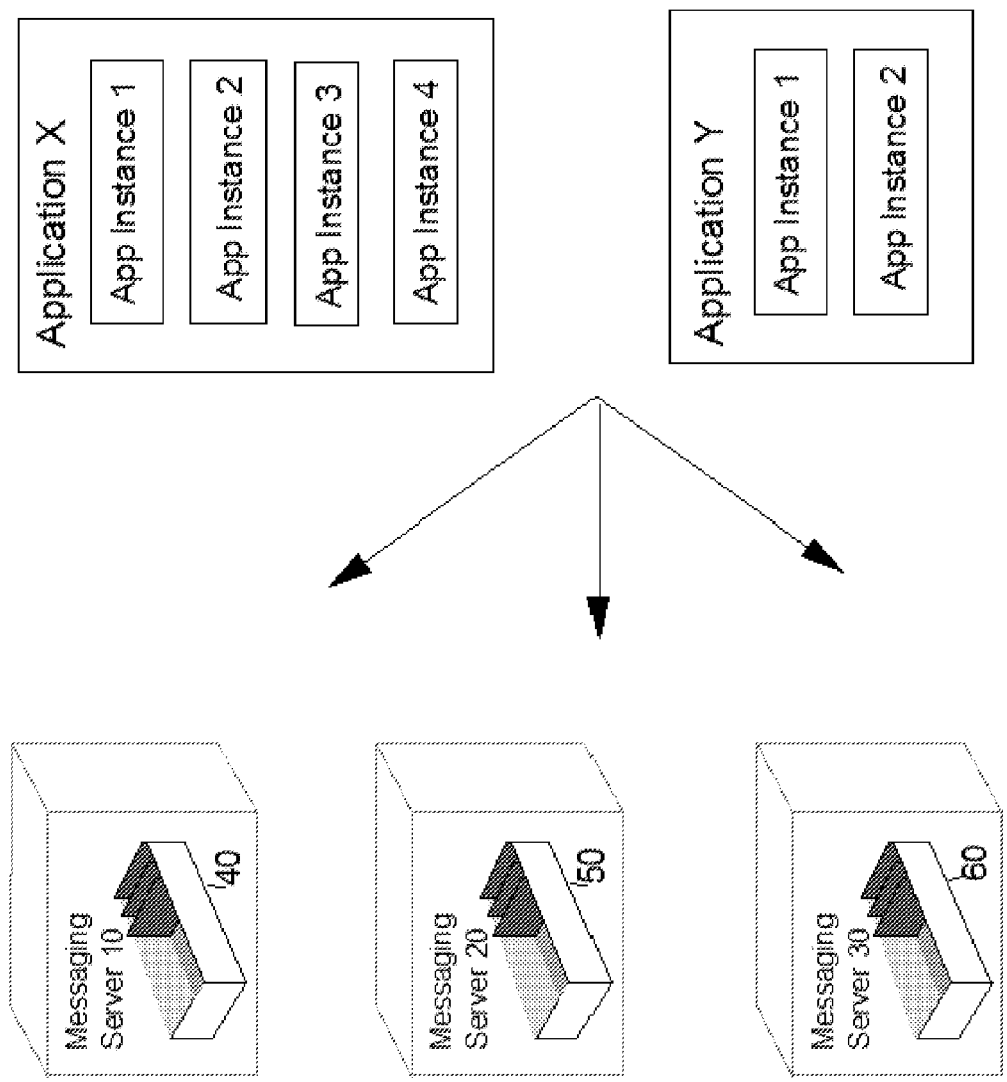
FIG. 4a illustrates the environment in which a second embodiment of the invention operates.
Figure 4B:
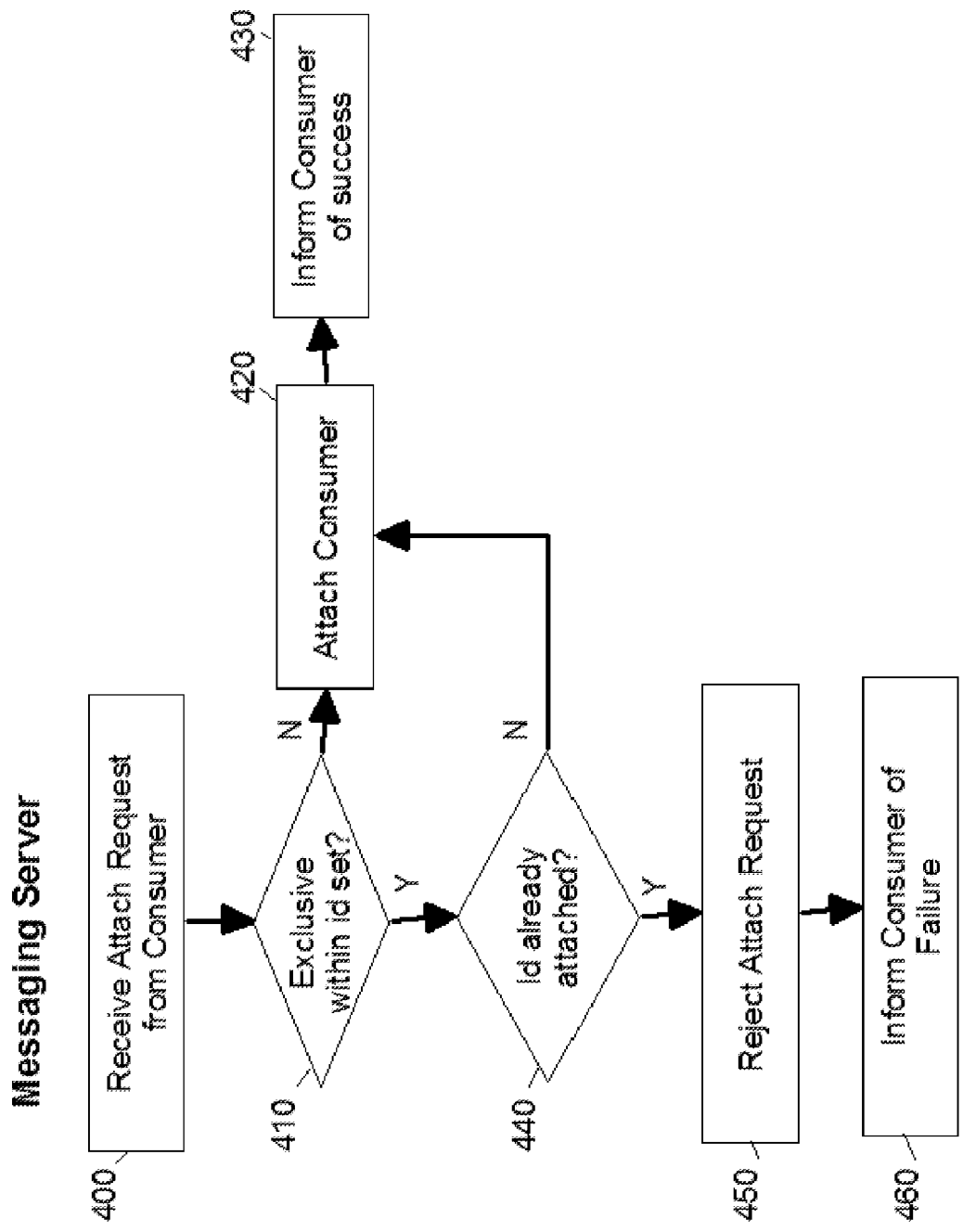
FIGS. 4b and 4c show the processing performed by a consuming application and a messaging server, in accordance with the second embodiment.
Figure 4C:
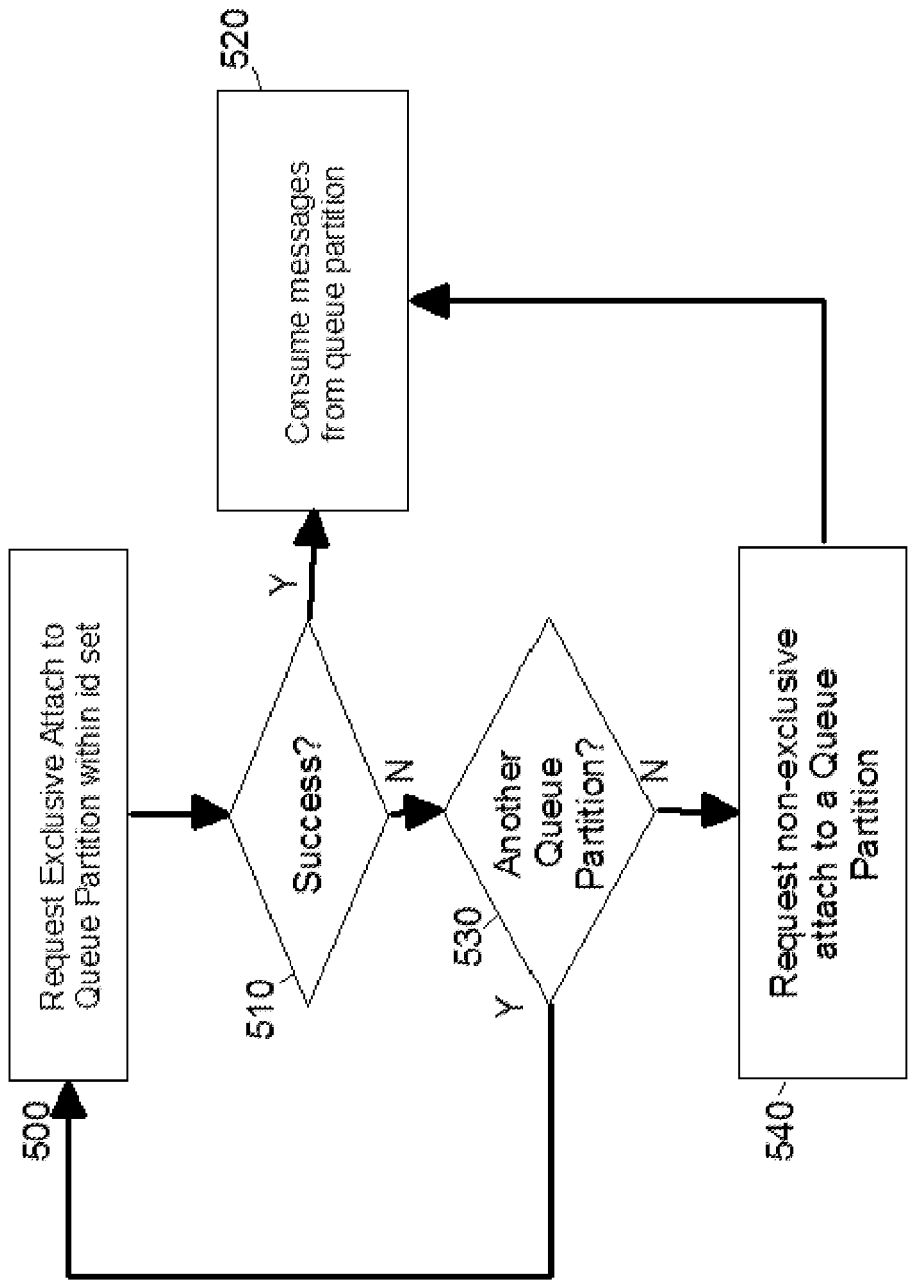

A second embodiment will now be discussed with reference to FIGS. 4a and 4b. FIG. 4a illustrates the environment in which the second embodiment is relevant and FIGS. 4b and 4c show the processing performed by the messaging server. Note, the actual components to achieve such processing is not illustrated since this is very similar to the components provided for the first embodiment, As shown in FIG. 4a, it is possible for different applications (e.g. X and Y) to be consuming from a set of messaging servers. Each application may consume a different type of messages and may do so via a plurality of application, instances. For example, application X may have four application instances, while application Y may only have 2 application instances. The danger is that if a round robin distribution is used to allocate application instances to messaging servers 10, 20, 30, one may end up with all of an application's instances consuming from only a subset of the available messaging servers. For example, application X instances 1 and 3 may consume from a queue partition on messaging server 10, while application X instances 3 and 4 may consume from a queue partition on messaging server 20. Thus it can be seen that messaging server 30 does not have anything to do with application X. This is problematic if applications X and Y consume different types of messages. Messages meant for application X on messaging server 30 will be left unconsumed.

Note, application instances may consume a type of message based on some property of the messages or may use a filter (selector) to select messages based on the value of header or payload content.

FIGS. 4b and 4c show how this problem is addressed and should be read in conjunction with one another. Each application has an id associated therewith. When an application instance (e.g. X, instance 1) requests an exclusive attach to queue partition, the request includes the id of the requesting application (e.g. X). Application X may therefore request that only one instance of itself be allowed to attach to the queue partition via an "exclusive within id set" attach option (step 500). An application's instances are typically completely separate. Thus one instance of an application is not aware what other instances of the same application have done previously.

Messaging server 40 receives the attach request at step 400 and determines at step 410 whether the request pertains to an "exclusive within id set" request. If the answer is no, then the consumer is attached and informed of the attach success (steps 420, 430). That is unless there is also a test as to whether the request is of the exclusive sort discussed with reference to FIG. 3b, step 310.

The consuming application X receives notification of the success of the attach at step 510 and begins to consume messages from the queue partition local to the messaging server (520).

If it is determined at step 410 that application X desires to attach only if no other instances of itself are already attached, then a determination at step 440 as to whether other instances of the same application are already attached. This is achieved by determining the ids of those applications already attached to see whether there is a match between any of those and the id included with the current request. If the answer is no, then application is attached and is informed of the success of the attach (steps 420, 430).

Again, the consuming application X receives notification of the success of the attach at step 510 and begins to consume messages from the queue partition to which it is attached (520).

If on the other hand, other instances of the same application are already attached to the queue partition, then the attach request is rejected (step 450). The application is informed of the failure at step 460.

Failure is determined by application X at step 510 and it is then determined whether it is possible to select another queue partition (step 530). As with the first embodiment, the consuming application works its way through a list of available queue partitions obtained, for example, at startup.

If there is another queue partition, then the process loops round and application X attempts to attach to another queue partition. If on the other hand, the list of queue partitions has been exhausted, it is preferably permitted for application X to attach to a queue partition at which other instances of itself already exist (step 540). In this way, the resource of application X is not wasted.

Similar to that described with reference to the first embodiment, when an attach request fails the consuming application is preferably informed as to the number of instances of itself already attached to that queue partition. The application instance preferably remembers which queue partition has the fewest instances of itself attached and requests attachment to this queue partition. The id of the requesting application is still included with the request. This is so that future consumers can be given an accurate count of attached consumers with this id. The application instance may choose to poll the other messaging servers periodically to determine whether its information is current.

While the second embodiment has been described in terms of an application instance requesting exclusive access to a queue partition with regard to application instances having the same id, the invention is not limited to such. Exclusive access could equally be requested with regard to application instances consuming the same type of message. Examples are application instances using the exact same selector or filter (e.g. only one application instance will consume IBM stock information from a particular queue partition) or application instances consuming based on the same property of a message. An application instance will specify its selector or property at attach time. Effectively the selector/property specified becomes the id (referred to earlier) of the consuming application instance.

Such exclusivity does not have to be at attach time only but could be for the duration of the attach. This does however mean that an application's instances may not double up etc. Note, each application may comprise one or more application instances.

It will be appreciated that while the invention has been described in terms of consuming applications only, the invention is equally applicable to producing applications.

While the invention has been described in terms of queue partitions, it is possible for multiple queues to form a larger logical queue. Thus the term 'partitioned queue' is intended to encompass this, as is the term, 'queue partition'.

Further, a messaging server may contain more than one queue partition. Those queue partitions may belong to the same logical queue or different queues.

It should be appreciated that a system may be provided that can cope with applications requesting exclusivity within an id set, using a selector or according to the first embodiment.

We claim:

1. A method for an application instance to request attachment to a queue, the method comprising:
   an application instance requesting attachment to a particular queue partition of a set of queue partitions, the particular queue partition residing on a messaging server within a plurality of messaging servers, each of the plurality of messaging servers holding at least one queue partition to form the set of queue partitions, the set of queue partitions together forming a single queue, the request requesting exclusivity with regard to other application instances based on a common identifier in the request used by the requesting application instance, wherein exclusivity is only requested while the attach request is being processed by the messaging server on which the queue partition resides;
   receiving an indication whether the request for exclusivity can be fulfilled in response to requesting attachment;
   responsive to an indication that the request for exclusivity can be fulfilled, attaching to the particular queue partition;
   responsive to an indication that the request for exclusivity cannot be fulfilled by the particular queue partition, repeating the request for exclusivity to at least one other queue partition within the set of queue partitions until either one of the queue partitions indicate the request can be fulfilled or all queue partitions have indicated they are unable to fulfil the request;
   when all queue partitions of the set of queue partitions are unable to fulfil the request for exclusivity, the application instance requesting, of at least one queue partition of the set of queue partitions, a non-exclusive attachment without regard for other application instances of the same application as the requesting application instance, and attaching to a queue partition indicating it can fulfil the request for non-exclusive attachment.

2. The method of claim 1, wherein there are a plurality of different applications, each of the applications having at least two instances each, the common identifier being an application id identifying one of the plurality of different applications and the request requesting that the requesting application instance is the only instance of the application identified by the common identifier to be attached to the queue partition.

3. The method of claim 1, wherein the common identifier is a message type identifier and the request requesting that the requesting application instance is the only application instance consuming a particular message type associated with the common identifier when compared with other application instances already attached to the queue.

4. The method of claim 1, wherein the application instance is an instance of a consuming application.

5. The method of claim 1 wherein the application instance is an instance of a producing application.

6. The method of claim 1, further comprising:
with each receipt of an indication that an attachment request has been unsuccessful, receiving the number of application instances already attached to a requested queue partition that prevent the attachment request from being successful;
using the number to determine which of the queue partitions in the set of queue partitions potentially has the least number of application instances attached thereto; and
requesting attachment to the queue partition with potentially the least number of application instances attached thereto.

7. The method of claim 1, wherein the common identifier is a message type and wherein the request for exclusivity requests that only one instance of an application consuming a particular message type is attached to the queue partition, wherein the step of determining whether the request can be fulfilled comprises:
determining whether there are any other application instances consuming the same message type as the requesting application instance and already attached to the queue partition.

8. Apparatus for an application instance to request attachment to a queue partition, the apparatus comprising:
means for an application instance to request attachment to a queue partition, the queue partition residing on a messaging server within a plurality of messaging servers, each of the plurality of messaging servers holding at least one queue partition to form a set of queue partitions, the set of queue partitions together forming a single queue, the request requesting exclusivity with regard to other application instances based on a common identifier in the request used by the requesting application instance, wherein exclusivity is only requested while the attach request is being processed by a receiving messaging server;
means, responsive to an indication that the request for exclusivity has been successful, for attaching to a queue partition indicating it can fulfil the request for exclusivity;
means, responsive to an indication that the request has been unsuccessful, for making the same request of each queue partition within the set of queue partitions, until either attachment is successful, or all queue partitions are unable to fulfil the request;
means, responsive to determining that all queue partitions are unable to fulfil the request for exclusivity, for requesting a non-exclusive attachment to a queue partition without regard for other application instances; and
means for non-exclusively attaching to the queue partition.

9. The apparatus of claim 8, wherein there are a plurality of different applications, each of the plurality of applications having at least two instances each, the common identifier being an application id identifying one of the plurality of different applications and the request requesting that the requesting application instance is the only instance of the application identified by the common identifier to be attached to the queue partition.

10. The apparatus of claim 8, wherein the common identifier is a message type identifier and the request requesting that the requesting application instance is the only application instance consuming a particular message type associated with the common identifier when compared with other application instances already attached to the queue.

11. The apparatus of claim 8, wherein the application instance is a producing application instance of the application.

12. The apparatus of claim 8, further comprising:
means for, with each receipt of an indication that an attachment request has been unsuccessful, receiving the number of application instances already attached to a requested queue partition that prevented the attachment request from being successful;
means for using the number to determine which of the queue partitions in the set of queue partitions potentially has the least number of preventing application instances attached thereto; and
means for requesting the non-exclusive attachment to the queue partition with potentially the least number of preventing application instances attached thereto.

13. A non-transitory computer-readable storage medium containing computer code to cause a computer to execute a method for an application instance to request attachment to a queue partition, the medium comprising:
code to cause an application instance requesting attachment to a queue partition, the queue partition residing on a messaging server within a plurality of messaging servers, each of the plurality of messaging servers holding at least one queue partition to form a set of queue partitions, the set of queue partitions together forming a single queue, the request requesting exclusivity with regard to other application instances based on a common identifier in the request used by the requesting application instance, wherein exclusivity is only requested by the requesting code while the attach request is being processed by the messaging server on which the queue partition resides;
code responsive to an indication that the request has been successful, for attaching to the queue partition indicating the request has been successful;
responsive to an indication that the request has been unsuccessful, the code requesting attachment making the same request of each queue partition within the set of queue partitions, until either attachment is successful, or all queue partitions are unable to fulfil the request;
responsive to determining that all queue partitions are unable to fulfil the request, the code requesting non-exclusive attachment to a specific queue partition without regard for other application instances; and
code for non-exclusively attaching to the specific queue partition.

14. The medium of claim 13, wherein there are a plurality of different applications, each of the plurality of applications having at least two instances each, the common identifier being an application id identifying one of the plurality of different applications and the code requesting attachment requesting that the requesting application instance is the only instance of the application identified by the common identifier to be attached to the queue partition.

15. The medium of claim 13, wherein the common identifier is a message type identifier and the code requesting attachment requesting that the requesting application instance is the only application instance consuming a particular message type associated with the common identifier when compared with other application instances already attached to the queue.

16. The medium of claim 13, wherein the application instance is an instance of a consuming application.

17. The medium of claim 13, wherein the application instance is an instance of a producing application.

18. The medium of claim 13, further comprising:

with each receipt of an indication that an attachment request has been unsuccessful, code for receiving the number of application instances already attached to a requested queue partition that prevent the attachment request from being successful;

the code requesting attachment using such the number to determine which of the queue partitions in the set of queue partitions potentially has the least number of application instances attached thereto; and the code requesting attachment requesting attachment to the queue partition with potentially the least number of application instances attached thereto.

* * * * *